US008719323B2

(12) United States Patent
Yu (10) Patent No.: US 8,719,323 B2
(45) Date of Patent: May 6, 2014

(54) METHODS FOR EFFICIENT STATE TRANSITION MATRIX BASED LFSR COMPUTATIONS

(75) Inventor: Meng-Lin Yu, Morganville, NJ (US)

(73) Assignee: LSI Corporation, San Jose, CA (US)

( * ) Notice: Subject to any disclaimer, the term of this patent is extended or adjusted under 35 U.S.C. 154(b) by 666 days.

(21) Appl. No.: 12/910,065

(22) Filed: Oct. 22, 2010

(65) Prior Publication Data

US 2011/0314073 A1 Dec. 22, 2011

Related U.S. Application Data

(60) Provisional application No. 61/355,177, filed on Jun. 16, 2010.

(51) Int. Cl.
*G06F 7/00* (2006.01)

(52) U.S. Cl.
USPC .......................... 708/209; 708/200; 708/520

(58) Field of Classification Search
None
See application file for complete search history.

(56) References Cited

U.S. PATENT DOCUMENTS

| 6,141,669 A * | 10/2000 | Carleton ................. 708/252 |
| 6,459,722 B2 * | 10/2002 | Sriram et al. ............ 375/130 |
| 2008/0077769 A1 | 3/2008 | Mimar |

* cited by examiner

*Primary Examiner* — Michael D Yaary
(74) *Attorney, Agent, or Firm* — Kermit D. Lopez; Luis M. Ortiz; Ortiz & Lopez, PLLC (57) ABSTRACT

A method for efficient state transition matrix based LFSR computations are disclosed. A polynomial associated with a linear feedback shift register is defined. This polynomial is used to generate a single step state transition matrix. The single step state transition matrix is then modified into a more general k-step state transition matrix. The resultant combined matrix is reduced in size and can be multiplied by a state input vector, ultimately producing a plurality of next state-input vectors thereby providing improved efficiency in computing a LFSR.

18 Claims, 5 Drawing Sheets

METHODS FOR EFFICIENT STATE TRANSITION MATRIX BASED LFSR COMPUTATIONS

CROSS-REFERENCE TO PROVISIONAL APPLICATION

This application claims the benefit of U.S. Provisional Patent Application Ser. No. 61/355,177, which was filed on Jun. 16, 2010 and entitled "Methods for Parallel Computation of Linear Sequential Circuits". The above-referenced provisional patent application is incorporated herein by reference in its entirety.

TECHNICAL FIELD

Embodiments are generally related to the field of computer processing. Embodiments are also related to linear feedback shift registers and related components, methods, and systems. Embodiments are additionally related to the complementation of components such as scramblers, descramblers, cyclic redundancy devices, and turbo-encoding technologies. Embodiments are additionally related to state transition matrix technologies.

BACKGROUND OF THE INVENTION

A linear feedback shift register (LFSR) is commonly utilized for implementing components such as, for example, scramblers, descramblers, cyclic redundancy check (CRC) devices, along with assisting with turbo-encoding in communication systems. As communications systems become faster, however, traditional hardware implementations of LFSR's have become dated and require improvement. Hardware implementations are not flexible because each LFSR needs to be mapped to a different hardware implementation.

Software implementations of LFSR's have become increasingly important in the filed of software-defined-radio. Functions that were traditionally defined in hardware are now implemented using software running on a computer device. Processors, however, are often ill-equipped to deal with LFSR. LFSR's are computed bit by bit. Therefore, many cycles are often needed to produce a single step state transition corresponding to a single bit output. One solution to this problem is a table lookup approach, which provides a small increase in efficiency. However, this method is limited because there is an exponential increase in computational cost as the size of the lookup table increases.

Another approach to LFSR computation efficiency improvement is to pre-compute a k-step state transition matrix and output generating matrix. This allows multiple state transitions and multiple output bits to be generated in a single cycle. In general, the k-step state transition matrix and k-step output generating matrix are combined to form a single matrix of size $(L+k)*(L+k)$, wherein L is the number of state bits of the LFSR. The state bits and input bits are used to form a single state-input vector (SIV). The combined matrix is then multiplied by the SIV to produce the next state and output.

While this approach can provide significant improvement in efficiency, it is still highly limited by the fixed data width of the processor. Generally, it is desirable to keep $L+k \leq w$, wherein w is the fixed data path width, in order to limit the impact on the processor's architecture redesign needs and to ease programming burdens. As such, the potential speedup is limited, particularly when L (representing the number of state bits or length of the LFSR) approaches the data path width. In this case, only small efficiency improvements can be achieved by pre-computing the matrices. In addition, when the above matrix approach is implemented as a standalone hardware accelerator, matrix size is critical, as it directly relates to the complexity and cost, and therefore computing efficiency, of the implementation.

It is therefore necessary to develop a method for reducing the size of the combined state transition matrix and output generating matrix to provide improved efficiency in LFSR computations.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for a method and system for enhanced LFSR computations.

It is another aspect of the present invention to provide for enhanced CRC generation and checking method and system.

It is yet a further aspect of the present invention to provide a method for efficient computation techniques for a LFSR.

The aforementioned aspects and other objectives and advantages can now be achieved as described herein. A method and system for efficient state transition matrix based LFSR computations are disclosed. The disclosed approach is based on the use of a linear feedback shift register. The disclosed approach involves generating and combining a state transition matrix and an output generating matrix of smaller dimension and implementing the combined matrix for efficient implementation of a LFSR in a hardware and/or software environment. Previous approaches to generating such matrices provided larger dimensional matrices which resulted in limited speed up capabilities. The disclosed approach avoids these problems and provides a smaller dimension matrix that can be directly implemented with a LFSR.

The disclosed approach involves an optimization method for an LFSR. The process begins by defining a polynomial associated with a given linear feedback shift register. The polynomial is used to generate a single step state transition matrix. This matrix is representative of the polynomial associated with the LFSR. Next, a more general k-step state transition matrix is derived using the single step state transition matrix.

The k-step state transition matrix is a generalized state transition matrix representing k consecutive single state transitions. In case 1, where there is only 1 feedback term in the polynomial, the rightmost L columns are then removed from the k-step state transition matrix, leaving a final transition matrix. The dimension of the final transition matrix is $L*k$. This represents a significantly smaller matrix than those previously known in the art.

The final transition matrix can then be multiplied by a state-input vector. The result is then XOR'ed with the state-input vector. This result can be employed to produce a plurality of next state-input vectors. Thus, the matrix size conventionally known in the art as $L*(L+k)$ can be reduced to $L*k$ for the equivalent speedup of k.

In another case, case 2, where the output is connected to a state bit, the state transition matrix can be augmented by adding k−L rows. While the size of the state transition matrix increases from $L*(L+k)$ to $k*(L+k)$, the output generating matrix is no longer needed for speedup of k.

In another case, case 3, where there are more than 1 feedback terms in the polynomial, the rightmost L−p columns, where p represents the lowest feedback term $x^{L-p}$, are then removed from the k-step state transition matrix. The dimension of the final transition matrix is L*(k+p). This represents a significantly smaller matrix than those previously known in the art.

The final transition matrix is then multiplied by a state-input vector. The result is then XOR'ed with the state-input vector padded with p leading 0's. This can be used to produce a plurality of next state-input vectors. Thus, the matrix size conventionally known in the art as L*(L+k) is reduced to L*(k+p) for the equivalent speedup of k.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
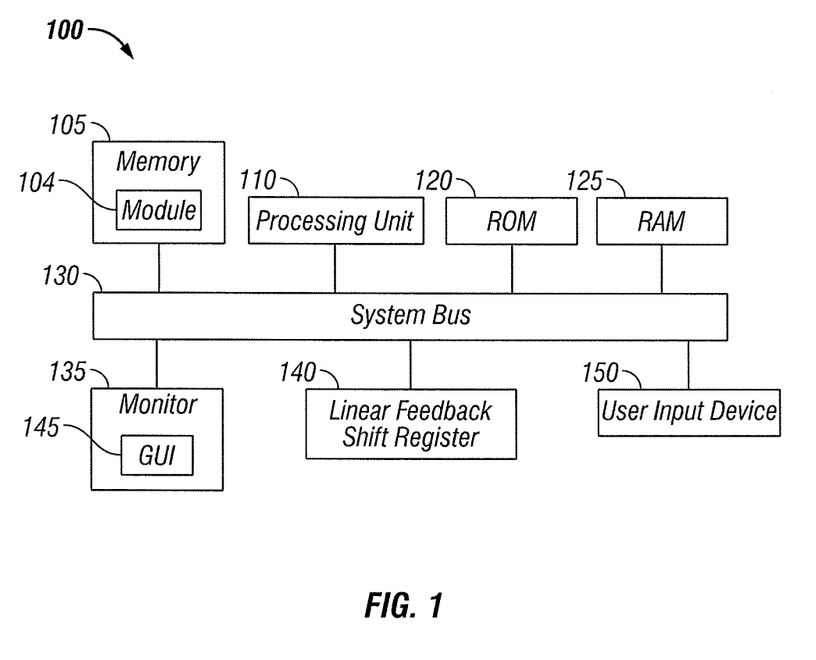
FIG. 1 illustrates a schematic view of a data-processing system in which the present invention may be embodied, including the use of a LFSR, which can be implemented in a processor.
Figure 2:
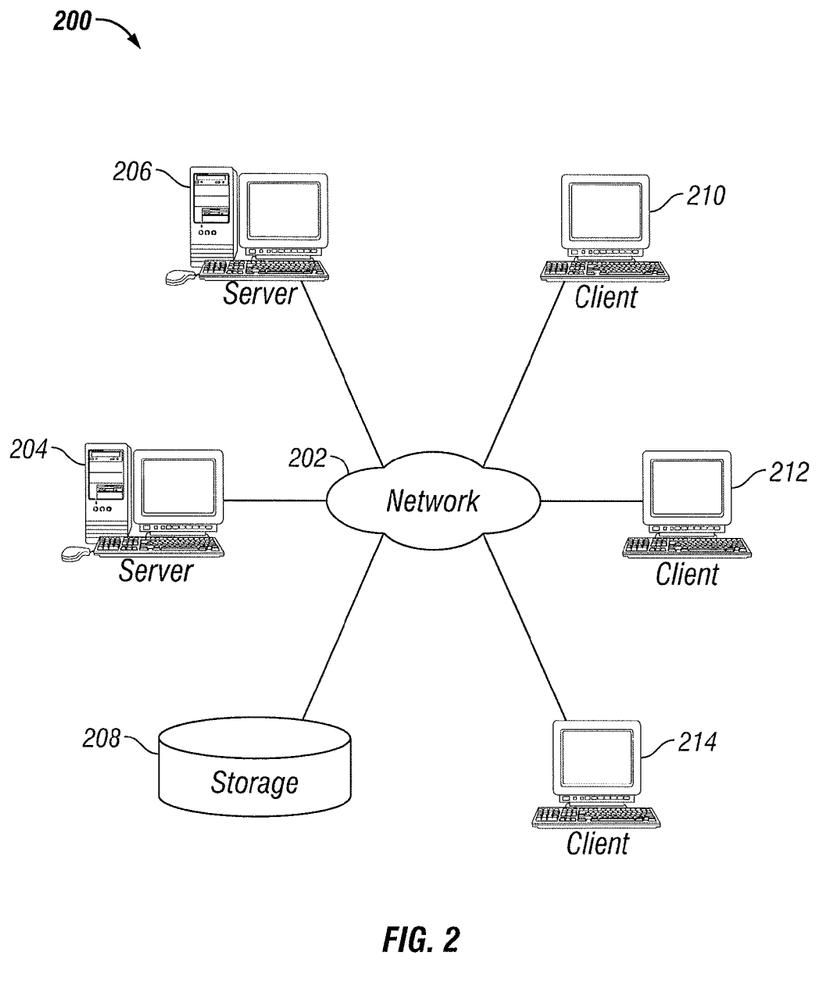
FIG. 2 depicts a graphical representation of a network of data-processing systems in which aspects of the present invention may be implemented.

FIGS. 1 and 2 depict exemplary diagrams of data-processing environments in which embodiments of the present invention may be implemented. It should be appreciated that FIGS. 1 and 2 are only exemplary and are not intended to assert or imply any limitation with regard to the environments in which aspects or embodiments of the present invention may be implemented. Many modifications to the depicted environments may be made without departing from the spirit and scope of the present invention.

The embodiments described herein can be implemented in the context of a host operating system and one or more modules. Such modules may constitute hardware modules such as, for example, electronic components of a computer system. Such modules may also constitute software modules. In the computer programming arts, a software "module" can be typically implemented as a collection of routines and data structures that performs particular tasks or implements a particular abstract data type.

Software modules generally include instruction media storable within a memory location of a data-processing apparatus and are typically composed of two parts. First, a software module may list the constants, data types, variable, routines, and the like that can be accessed by other modules or routines. Second, a software module can be configured as an implementation, which can be private (i.e., accessible perhaps only to the module), and that contains the source code that actually implements the routines or subroutines upon which the module is based. The term "module" as utilized herein can therefore generally refer to software modules or implementations thereof. Such modules can be utilized separately or together to form a program product that can be implemented through signal-bearing media, including transmission media and recordable media. An example of such a module is module 104 depicted in FIG. 1.

It is important to note that, although the embodiments are described in the context of a fully functional data-processing apparatus (e.g., a computer system), those skilled in the art will appreciate that the mechanisms of the embodiments are capable of being distributed as a program product in a variety of forms, and that the present invention applies equally regardless of the particular type of signal-bearing media utilized to actually carry out the distribution. Examples of signal bearing media include, but are not limited to, recordable-type media such as floppy disks or CD ROMs and transmission-type media such as analogue or digital communications links.

Referring to the drawings and in particular to FIG. 1, there is depicted a data processing apparatus 100 that can be implemented in accordance with a preferred embodiment. As shown in FIG. 1, a memory 105, a processor (CPU) 110, a Read-Only memory (ROM) 120, and a Random-Access Memory (RAM) 125 are generally connected to a system bus 130 of data-processing apparatus 100. Memory 105 can be implemented as a ROM, RAM, a combination thereof, or simply a general memory unit. Module 104 can be stored within memory 105 and then retrieved and processed via processor 110 to perform a particular task. A user input device 150 such as a keyboard, mouse, or another pointing device, is also connected to and communicates with system bus 130. Additionally, a linear feedback shift register 140 is connected to all the components of data processing apparatus 100 via the system bus 130. Linear feedback shift register 140 may be implemented as hardware or software and may be included in memory 105 as a module, for example, module 104. Linear feedback shift register 140 may also be implemented in hardware as part of the processor 110 as an intrinsic instruction of the processor's instruction set.

Depending upon the design of data-processing apparatus 100, memory 105 may be utilized in place of or in addition to ROM 120 and/or RAM 125. A monitor 135 can also be connected to system bus 130 and can communicate with memory 105, processor 110, ROM 120, RAM 125, and other system components. Monitor 135 generally functions as a display for displaying data and information for a user and for interactively displaying a graphical user interface (GUI) 145.

Note that the term "GUI" generally refers to a type of environment that represents programs, files, options, and so forth by means of graphically displayed icons, menus, and dialog boxes on a computer monitor screen. A user can interact with the GUI to select and activate such options by pointing and clicking with a user input device 150 such as, for example, a pointing device such as a mouse and/or with a keyboard. A particular item can function in the same manner to the user in all applications because the GUI provides standard software routines (e.g., module 104) to handle these elements and reports the user's actions. The GUI can further be used to display the electronic service manual.

FIG. 2 illustrates a graphical representation of a network of data processing systems in which aspects of the present invention may be implemented. Network data processing system 200 can be provided as a network of computers in which embodiments of the present invention may be implemented. Network data processing system 200 contains network 202, which can be utilized as a medium for providing communications links between various devices and computers connected together within network data processing system 100. Network 202 may include connections such as wired, wireless communication links, fiber optic cables, USB cables, Ethernet connections, and so forth.

In the depicted example, server 204 and server 206 connect to network 202 along with storage unit 208. In addition, clients 210, 212, and 214 connect to network 202. These clients 210, 212, and 214 may be, for example, personal computers or network computers. Data-processing system 100 depicted in FIG. 1 can be, for example, a client such as client 210, 212, and/or 214. Alternatively, data-processing system 100 can be implemented as a server such as servers 204 and/or 206, depending upon design considerations.

In some embodiments, network data processing system 200 may be the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages. Of course, network data processing system 200 may also be implemented as a number of different types of networks such as, for example, a secure intranet, a local area network (LAN), or a wide area network (WAN), or a 3G/4G network.

The following description is presented with respect to embodiments of the present invention, which can be embodied in the context of a data-processing system such as data-processing system 100, data-processing system 200, and network 202 depicted respectively in FIGS. 1 and 2. The present invention, however, is not limited to any particular application or any particular environment. Instead, those skilled in the art will find that the system and methods of the present invention may be advantageously applied to a variety of system and application software including database management systems, word processors, and the like. Moreover, the present invention may be embodied on a variety of different platforms including Macintosh, UNIX, LINUX, and the like. Therefore, the description of the exemplary embodiments, which follows, is for purposes of illustration and not considered a limitation.

Figure 3:
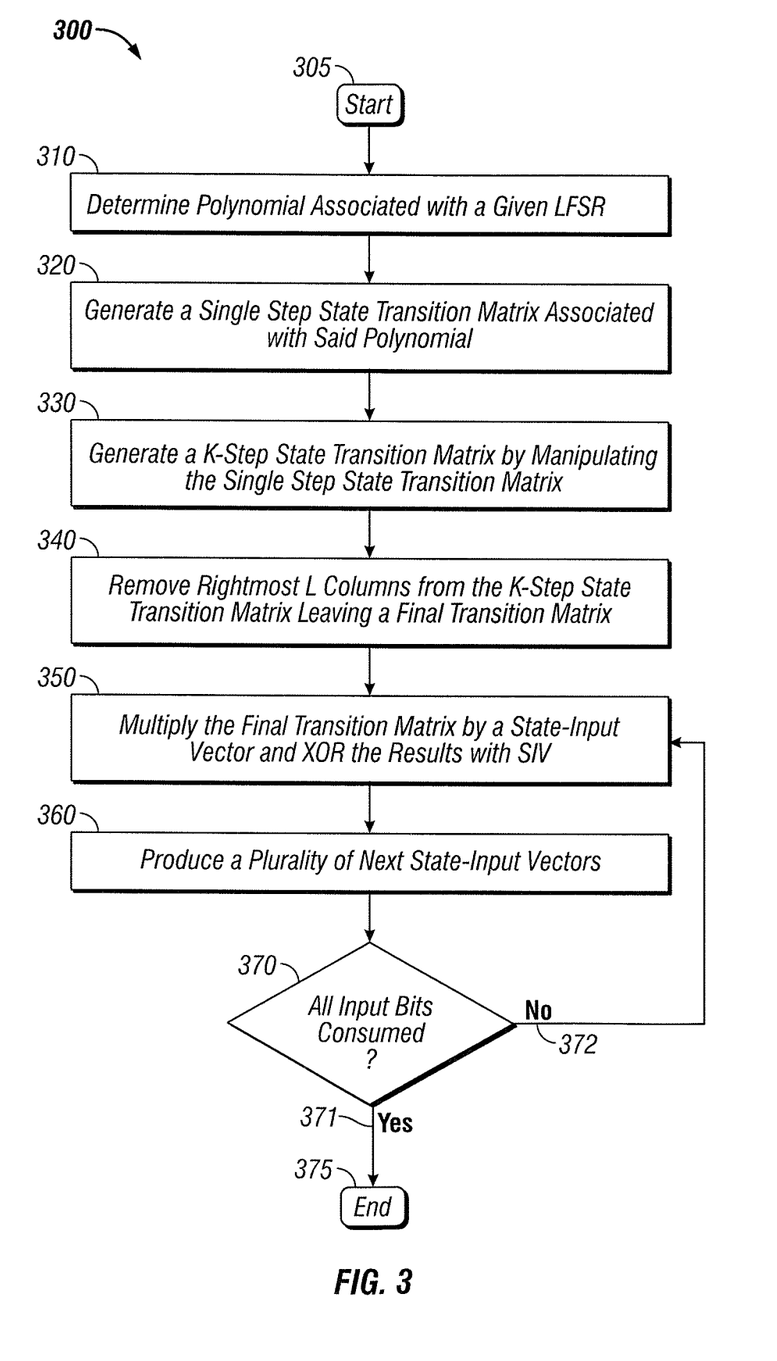
FIG. 3 illustrates a high-level flow chart of operations depicting logical operational steps of a method for efficient state transition matrix based LFSR computations when there is only 1 feedback term in the polynomial.

FIG. 3 illustrates a high-level flow chart of operations depicting logical operational steps of a method for efficient state transition matrix based LFSR computations, in accordance with a preferred embodiment. Note that the method 300 of FIG. 3 and other methodologies disclosed herein can be implemented in the context of a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as, but not limited to, Random Access Memory (RAM), and communication media such as computer and telephone networks including Ethernet, the Internet, wireless networks, and like network systems as embodied in FIG. 2.

It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent. Thus, the methods 300, 400, and 500, for example, described herein can be deployed as process software in the context of a computer system or data-processing system as that depicted in FIGS. 1 and 2.

The disclosed embodiments describe and illustrate a method 300 for efficient state transition matrix based LFSR implementations. As indicated at block 305, the process begins. Next, at block 310, a polynomial associated with a given LFSR is defined. A LFSR is a form of a shift register whose input bit is a linear function of its previous state and its external input. A special type of LFSR can be defined where only one feedback term, $x^L$, is provided as input.

One common application of a LFSR with only one feedback term is cyclic redundancy check (CRC) generation and checking. A CRC has no direct output and requires no output generating matrix. The final state after LFSR computation is the CRC output. A CRC can be defined by a polynomial which is then used to describe the taps, or positions in the LFSR, that will affect the next state. As indicated at block 320, a single step state transition matrix $M_1$ of size $L*(L+1)$ is generated based on the polynomial associated with the LFSR. Each row i of the single step state transition matrix represents a state bit $s_{i-1}$ and each column j represents a state-input vector bit. It is important to note that $M_1$ is comprised of a shifted identify matrix after its first column. The first column represents the feedback term and is the only column with more than one "1" in the matrix.

The next step is to generate a k-step state transition matrix using the single step state transition matrix as described at block 330. The single step state transition matrix $M_1$ can be augmented to be a $(L+k)*(L+k)$ square matrix $A_1$ by adding 0s to new matrix elements except the rightmost L+k−1 columns which form an identity matrix. The augmented state transition matrix $A_1$ is multiplied by itself k times, representing the k consecutive single state transitions associated with the LFSR, to form the intermediate k-step state transition matrix $M_k'$ of size $(L+k)*(L+k)$.

While $M_k'$ is the mathematically correct form for k-step state transition matrix, it is usually too big to be implemented efficiently. Instead, $M_k'$ can be decomposed into 2 matrices, $M_{k1}'$ with all zeros in the right L columns and $M_{k2}'$ with all zeros in the left k columns. Note the bottom k rows of $M_{k1}'$ are unimportant because they are all zeros.

$M_{k2}'$ is an identity matrix. The state-input vector multiplied with $M_{k2}'$ is simply the state-input vector itself. Since $M_k'=M_{k1}'+M_{k2}'$, any $SIV*M_k'$ can be simplified as $SIV*M_{k1}'+SIV$, where + is the XOR binary addition operation. In this way, $M_k'$ can be simplified by removing the bottom k rows and the rightmost L columns as shown at block 340. This step leaves a final transition matrix $M_k$, with a dimension of L*k.

Next, at block 350, the final transition matrix is multiplied by a state input vector. The first state-input vector consists of L state bits and K−L next input bits. The next state-input vector is determined by performing an XOR operation between the input vector and the resultant vector. The XOR operation is the logical exclusive disjunction operation (also known as the exclusive or operation). The XOR is a logical operation on two logic values where the result is true only if one or the other of the initial logic values is true, but not if both values are true.

As illustrated at block 360, a plurality of next state input vectors are then generated. The new next state and next input bits form a new state input vector. The processing goes back to block 350 and then iterates as shown by block 370 and 372 until all the input bits are consumed as indicated at block 371. For CRC without output, the final results will be in the state part of the last state-input vector.

It is important to note that when the number of input bits is not a multiple of k, traditional methods can be used to compute the LFSR function for the residue bits. Since the residue bits length is less than k when the performance demanding application has input bits of length much greater than k, the residue bits computation is insignificant.

The method is then finished at block 375. The method results in a k-step state transition matrix $M_k$ of dimension L*k, thereby providing improved efficiency of LFSR implementation on a hardware or software apparatus as described above with respect to FIGS. 1 and 2.

Figure 4:
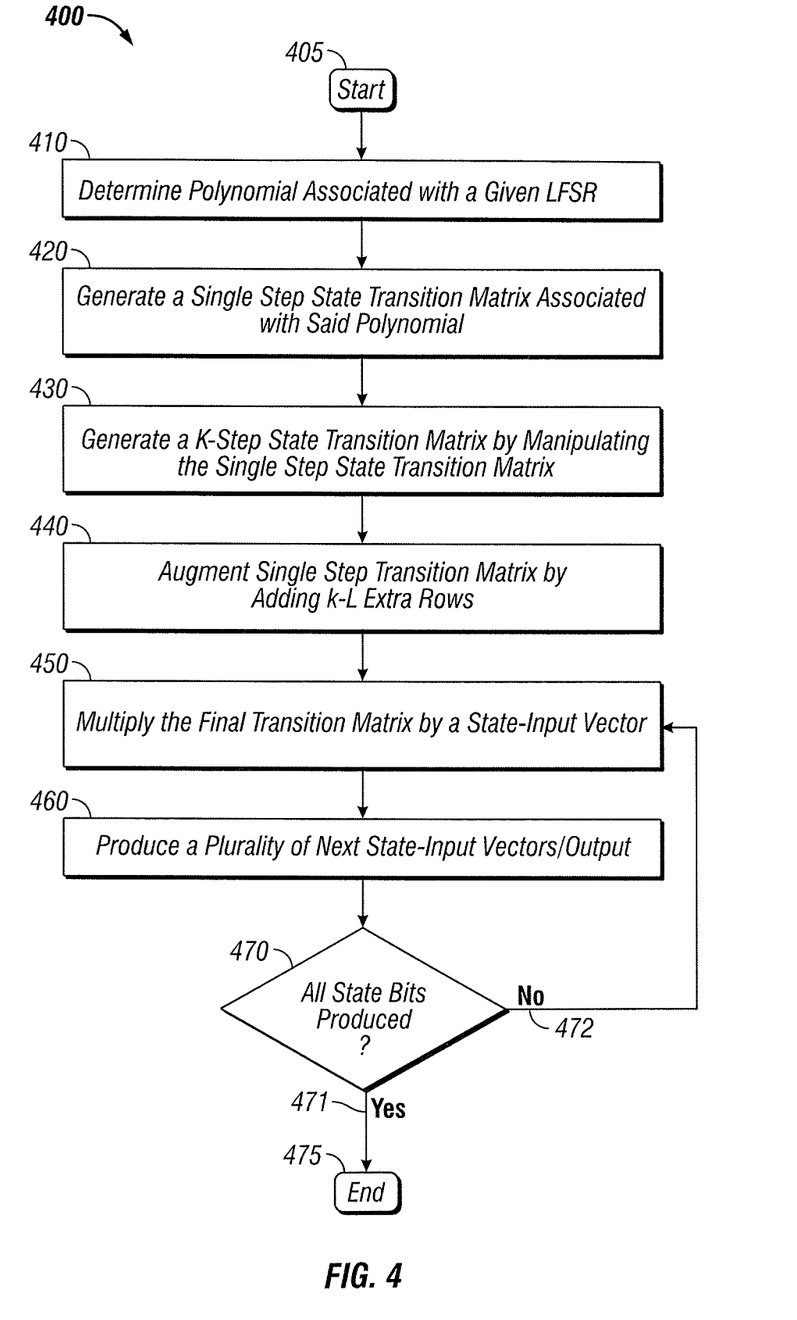
FIG. 4 illustrates a high-level flow chart of operations depicting logical operational steps of a method for efficient state transition matrix based LFSR computations when the LFSR output is a state bit.

The disclosed embodiments further describe and illustrate a method 400 for efficient state transition matrix based LFSR computations. As depicted at block 405, the process begins. Next, as indicated at block 410, a polynomial associated with a given LFSR is defined. A special type of LFSR can be defined where the input bit is a linear function of its previous state and its external input, but its output is connected to a state bit.

One common application for a LFSR with a state bit as output is the Gold sequence scrambler used in 4G LTE, which may be implemented in accordance with the systems shown in FIGS. 1 and 2. A scrambler can be defined by a polynomial, which can be utilized to describe the taps that will affect the next state. As illustrated at block 420, a single step state transition matrix $M_1$ of size L*(L+1) is generated based on the polynomial associated with the LFSR. Each row i of the single step state transition matrix represents a state bit $s_{i-1}$ and each column j represents a state-input vector bit.

The next step is to generate a k-step state transition matrix using the single step state transition matrix, as described at block 430. At block 440, the single step state transition matrix $M_1$ can be augmented by adding k–L extra rows to represent extra state transitions of k–L state bits being shifted out of the LFSR in addition to the regular L next state bits. The extra rows produce those missing bits in the SIV to keep all the k state bits, which is the output for case 2. The augmented single step state transition matrix $M_1$ is further augmented to be a (L+k)*(L+k) square matrix $A_1$. The augmented state transition matrix $A_1$ is multiplied by itself k times, representing the k consecutive single state transitions associated with the LFSR, to form the intermediate k-step state transition matrix $M_k'$ of size (L+k)*(L+k). The bottom L rows are unimportant and therefore removed.

Note that the size of k-step state transition matrix is increased from L*(L+k) to k*(L+k), but the output generating matrix is reduced from k*(L+k) to zero. Thus, the overall complexity is reduced by L*(L+k) for the combined state transition matrix and output generating matrix.

Next, as described at block 450, the final transition matrix is multiplied by a state input vector. As indicated thereafter at block 460, a plurality of next state input vectors and output are generated. The new next state bits form a new SIV. If all the state bits are not produced as illustrated by blocks 470 and 472, the processing goes back to block 450 and then repeats until all the state bits are produced as depicted by block 471. The method then ends at block 475.

If there is only 1 state feedback term in the polynomial as illustrated in FIG. 3 above, the final state transition matrix can also be simplified based on the steps describing the method in FIG. 3. The final size of the state transition matrix is then k*k, instead of k*(L+k).

Figure 5:
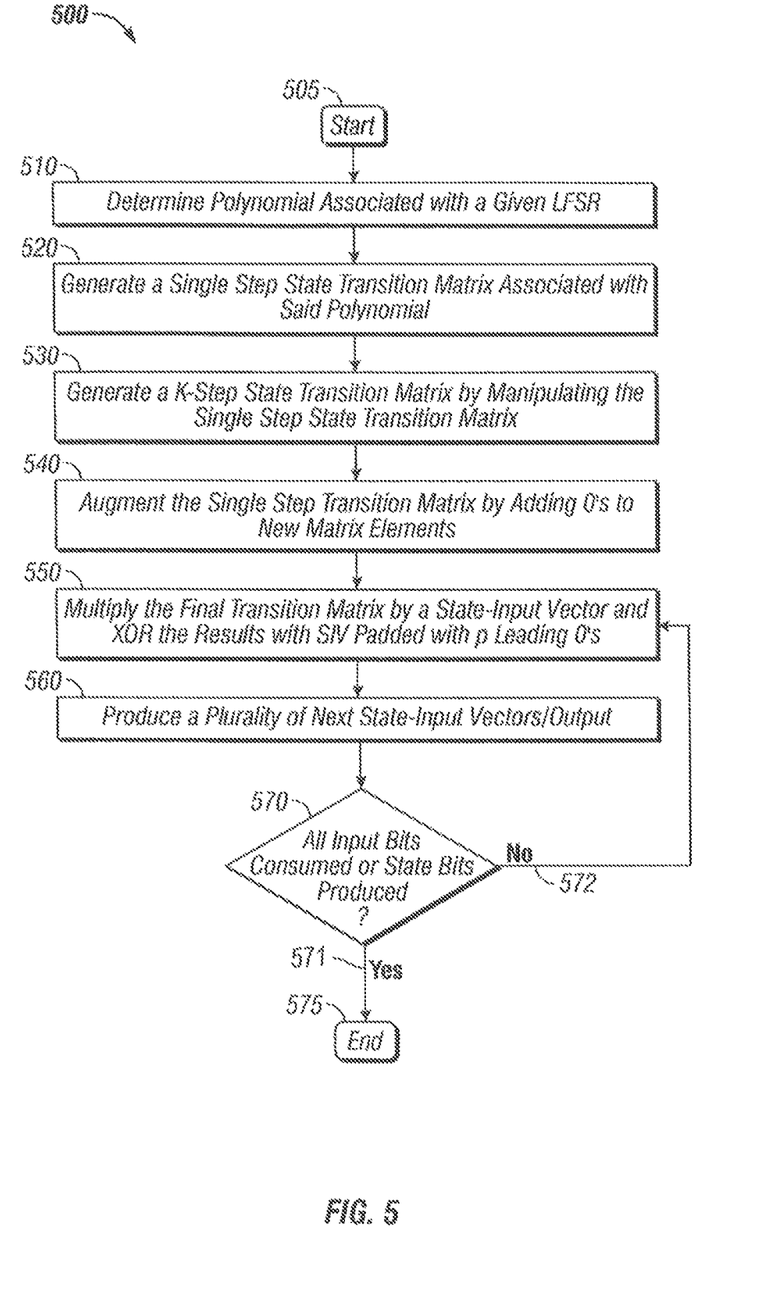
FIG. 5 illustrates a high-level flow chart of operations depicting logical operational steps of a method for efficient state transition matrix based LFSR computations when there is more than 1 feedback term in the polynomial.

The disclosed embodiments describe and illustrate a method 500 for efficient state transition matrix based LFSR computations. As described at block 505, the process begins. Next, as illustrated at block 510, a polynomial associated with a given LFSR is defined. In a preferred embodiment, a LFSR may be defined where an input bit is a linear function of its previous state and external input bits and has more than one feedback term as input.

One common application of such a LFSR is a turbo encoder in LTE. A turbo encoder can be defined by a polynomial which is then used to describe the positions in the LFSR that will affect the next state. As indicated at block 520, a single step state transition matrix $M_1$ of size L*(L+1) is generated based on the polynomial associated with the LFSR. Each row i of the single step state transition matrix represents a state bit $s_{i-1}$ and each column j represents a state-input vector bit. It is important to note that $M_1$ is comprised of a shifted identify matrix of dimension L+1–p after the first p column, wherein p is in the lowest power feedback term is $x^{L-p}$ in the polynomial. The first p columns represent the feedback terms and are the only columns with more than one "1" in the matrix.

The next step is to generate a k-step state transition matrix using the single step state transition matrix, as shown at block 530. The single step state transition matrix $M_1$ can be augmented to be a (L+k)*(L+k) square matrix $A_1$ by adding 0's to new matrix elements except where the rightmost L+k–p columns form an identity matrix, as shown at block 540. The augmented state transition matrix $A_1$ is multiplied by itself k times, representing the k consecutive single state transitions associated with the LFSR, to form the intermediate k-step state transition matrix $M_k'$ of size (L+k)*(L+k).

While $M_k'$ is the mathematically correct form for k-step state transition matrix, it is usual too big to implement it efficiently. Instead, $M_k'$ is decomposed into 2 matrices, $M_{k1}'$ with all 0's in the right L–p columns and $M_{k2}'$ with all 0's in the left k+p columns. The bottom k rows of $M_{k1}'$ are unimportant because they are all 0's.

$M_{k2}'$ is a right lower corner identity matrix. The p 0-padded state-input vector multiplied with $M_{k2}'$ is just p 0's followed by the state-input vector itself. Since $M_k'=M_{k1}'+M_{k2}'$, any SIV*$M_k'$ can be simplified as SIV*$M_{k1}'$+SIV padded with p leading 0's, where + is the XOR binary addition. In this way, $M_k'$ can be simplified by removing the bottom k rows and the rightmost L–p columns. This step leaves a final matrix $M_k$. The dimension of this matrix is L*(k+p).

Next, at block 550, the final transition matrix is multiplied by a state input vector. The first state-input vector consists of L state bits and k–L next input bits. The next state-input vector is determined by performing an XOR operation between the input-state vector (padded with p leading 0's) and the resultant vector. As indicated at block 560, a plurality of next state vectors are generated. The new next state and next input bits form a new state input vector. If all the input bits are not consumed or all the state bits are not produced, the processing goes back to block 550 as indicated at blocks 570 and 572. The process then repeats until all the input bits are consumed or all state bits are produced as described by block 571. The method then ends at block 575.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" or "data-processing system" includes any data-processing apparatus including, but not limited to, personal computers, servers, workstations, network computers, main frame computers, routers, switches, Personal Digital Assistants (PDA's), telephones, and any other system capable of processing, transmitting, receiving, capturing and/or storing data.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for state transition matrix-based linear feedback shift register computations, said method comprising:
    computing a transition matrix associated with a linear feedback shift register, said transition matrix comprising a k-step transition matrix based on a single step state transition matrix;
    computing an output matrix associated with said linear feedback shift register defined such that an input bit is a linear function of a previous state and external input bits and comprises more than one feedback as input;
    combining said transition matrix with said output matrix;
    reducing a size of said transition matrix and said output matrix following combining said transition matrix with said output matrix; and
    configuring said transition matrix to comprise said single step state transition matrix wherein a size of said k-step transition matrix is increased from $L*(L+k)$ to $k*(L+k)$, but an output generating matrix is reduced from $k*(L+k)$ to zero, thereby providing an improved speedup capability for calculating a next state and/or an output of said linear feedback shift register.

2. The method of claim 1 further comprising:
    defining a polynomial associated with said single step state transition matrix, wherein said polynomial corresponds to said linear feedback shift register defined such that an input bit is a linear function of a previous state and external input bits and comprises more than one feedback as input.

3. The method of claim 2 wherein reducing said size of said transition matrix and said output matrix following combining said transition matrix with said output matrix, further comprises:
    augmenting said single step transition matrix;
    generating said k-step state transition matrix $M_k$ of dimension $L*k$; and
    multiplying a final transition matrix by a state input vector.

4. The method of claim 3 wherein augmenting said single step transition matrix further comprises:
    adding zeros to a plurality of new matrix elements; and
    associating one feedback term with said polynomial.

5. The method of claim 4 further comprising:
    performing an XOR operation on said state input vector and resultant vector; and
    utilizing said linear feedback shift register in combination with a cyclic redundancy checking device.

6. The method of claim 4 wherein augmenting said single step transition matrix further comprises:
    adding a plurality of rows to said single step transition matrix; and
    producing an output of said linear feedback shift register wherein said output Is a state bit.

7. The method of claim 6 further comprising: utilizing said linear feedback shift register in combination with a gold sequence scrambler.

8. The method of claim 3 wherein augmenting said single step transition matrix further comprises: adding zeros to a plurality of new matrix elements; and associating more than one feedback term with said polynomial.

9. The method of claim 8 further comprising: performing an XOR operation on said state input vector and a resultant vector; and utilizing said linear feedback shift register in combination with a turbo encoder.

10. The method of claim 3 further comprising: iterating said steps until all input bits are consumed or all state bits are produced wherein said iteration produces a plurality of next state-input vectors.

11. A method for state transition matrix-based linear feedback shift register computations, said method comprising:
    defining a linear feedback shift register such that an input bit thereof is a linear function of a previous state and external input bits and comprises more than one feedback as input
    defining a polynomial associated with said linear feedback shift register;
    computing a transition matrix associated with said linear feedback shift register, said transition matrix comprising a k-step transition matrix based on a single step state transition matrix;
    computing an output generating matrix based on said polynomial associated with said linear feedback shift register;
    combining said transition matrix and output matrix to form a combined transition matrix;
    reducing a size of said combined transition matrix;
    removing columns from said transition matrix;
    multiplying transition matrix by at least one state input vector; and
    computing an XOR operation between the result of multiplying said transition matrix and said at least one state input vectors wherein a size of said k-step transition matrix is increased from $L*(L+k)$ to $k*(L+k)$, but said output generating matrix is reduced from $k*(L+k)$ to zero, thereby providing an improved speedup capability for calculating the next state and/or output of said linear feedback shift register.

12. The method of claim 11 further comprising: utilizing said linear feedback shift register in combination with a cyclic redundancy checking device.

13. The method of claim 11 further comprising associating one feedback term with said polynomial.

14. The method of claim 13 further comprising:
    augmenting said transition matrix, by adding extra rows to said transition matrix;
    multiplying said transition matrix by said at least one state input vector; and
    iterating said steps until a plurality of state bits are produced or all input bits are consumed.

15. The method of claim 14 further comprising: utilizing said linear feedback shift register in combination with a gold sequence scrambler.

16. The method of claim 14, wherein the output of said linear feedback shift register produces an output comprising said plurality of state bits.

17. The method of claim 13, wherein there is more than one feedback term associated with said polynomial.

18. The method of claim 17 further comprising: utilizing said linear feedback shift register in combination with a turbo encoder.

* * * * *